(12) United States Patent
Faulkenberry

(10) Patent No.: US 9,285,048 B2
(45) Date of Patent: Mar. 15, 2016

(54) ANTI-CONTAMINATION VALVE HANDLE SHROUD

(71) Applicant: Peter Faulkenberry, Conesus, NY (US)

(72) Inventor: Peter Faulkenberry, Conesus, NY (US)

( * ) Notice: Subject to any disclaimer, the term of this patent is extended or adjusted under 35 U.S.C. 154(b) by 249 days.

(21) Appl. No.: 13/974,437

(22) Filed: Aug. 23, 2013

(65) Prior Publication Data

US 2014/0069524 A1 Mar. 13, 2014

Related U.S. Application Data

(60) Provisional application No. 61/700,405, filed on Sep. 13, 2012.

(51) Int. Cl.
*F16K 27/12* (2006.01)
*F16K 27/00* (2006.01)

(52) U.S. Cl.
CPC ............... *F16K 27/00* (2013.01); *F16K 27/12* (2013.01); *Y10T 137/7043* (2015.04); *Y10T 137/7062* (2015.04)

(58) Field of Classification Search
CPC ............. F16K 27/12; Y10T 137/7043; Y10T 137/7062; Y10T 137/7047
See application file for complete search history.

(56) References Cited

U.S. PATENT DOCUMENTS

| | | | | |
|---|---|---|---|---|
| 2,065,087 | A | * 12/1936 | May | 137/454.5 |
| 2,206,707 | A | * 7/1940 | Shaw | 137/382 |
| 2,737,972 | A | 3/1956 | Callery et al. | |
| 2,934,036 | A | 4/1960 | Anderson et al. | |
| 3,067,630 | A | 12/1962 | Hartman | |
| 4,165,659 | A | * 8/1979 | Fawley | 74/558 |
| 4,207,918 | A | 6/1980 | Burns et al. | |
| 4,407,324 | A | 10/1983 | Caddell | |
| 4,453,562 | A | 6/1984 | Palkovics | |
| 6,032,688 | A | 3/2000 | Byars | |
| 6,164,345 | A | * 12/2000 | Haddox | 141/86 |
| 6,182,691 | B1 | * 2/2001 | DeCaluwe | 137/556.3 |
| 6,907,907 | B2 | 6/2005 | Maida | |
| 6,971,401 | B1 | 12/2005 | Carpenter | |
| 7,762,275 | B1 | 7/2010 | Ventura | |
| 2006/0278275 | A1 | * 12/2006 | Stewart et al. | 137/382 |

OTHER PUBLICATIONS

HD Ignition Switch w/ Weatherproof Cover—http://store.cdoc.com/hdignitionswitchwweatherproofcover.aspx, Jun. 12, 2012.
Toggle Switch 15A 250 VAC Waterproof Boot Cover On-On—http://www.westfloridacomponents.com/SW131APH01/Toggle+Switch+15A+250+VAC+Waterproof+Boot+Cover+On-On.html, Jun. 12, 2012.

* cited by examiner

*Primary Examiner* — Kevin Murphy
(74) *Attorney, Agent, or Firm* — Basch & Nickerson LLP

(57) ABSTRACT

An enclosure for a valve assembly includes a base having an opening that allows a portion of a valve assembly to pass therethrough, and a valve handle shroud, extending from the base, to encapsulate a handle/stem assembly of the valve assembly.

20 Claims, 4 Drawing Sheets

ANTI-CONTAMINATION VALVE HANDLE SHROUD

PRIORITY INFORMATION

This application claims priority from U.S. Provisional Patent Application, Ser. No. 61/700,405, filed on Sep. 13, 2012. The entire content of U.S. Provisional Patent Application, Ser. No. 61/700,405, filed on Sep. 13, 2012, is hereby incorporated by reference.

BACKGROUND

In the food processing industry, various standards have been developed in an effort to protect against the contamination of the food supply. Food contamination can be microbial, environmental, or both with microorganism being the more common. Environmental contaminants that can enter the food supply chain include pesticides, heavy metals, and other chemical agents.

Due to the complexity of food processing, a multitude of opportunities exist for food to become tainted as it is prepared for consumption, especially refrigerated liquids that are used as additives in the process or are being transported as a finished food product.

The integrity of a food processing environment is based on the fundamental principles applied to any closed system design, whereby inputs and outputs are closely monitored for incidental and unforeseen contravention of the closed system that may give rise to the potential for the infiltration of biohazardous contamination. The breaching of the closed system may occur at a number of points in the system; however, the most common breaches are where the product is either introduced into the system or exits the system or where system components may interact with the product; e.g., valves or regulators.

With respect to the potential breach, due to a valve mechanism, the conventional valve used in the process system is designed to include a flow control member, either a gate or a ball, which directly interacts with the product and includes an associated stem/handle assembly that extends directly into the external ambient environment from the closed system, in other words, outside the closed system.

The conventional valve stem further includes a compliant sealing member, often referred to as a "packing gland" or O-ring, which provides for a slip joint for the stem to pass through, thereby placing a "sealed" barrier between the product being controlled and the outside environment.

However, the conventional sealing member does not necessarily provide a perfect or impervious seal, due to many factors such as the wear caused by the operating (continual rotation) of the valve handle. While the seal may prevent the product from passing therethrough, materials (contaminants) from the environment, having a minute molecular composition, can often pass by the seal, thereby compromising the quality of or contaminating the product.

The contamination may also be realized when there is a pressure differential between the processing system and the outside atmospheric pressure.

In addition, conduit lines leading into or out of processing chambers may be temperature controlled, and therefore, must include an insulating jacket there around, whereas fiberglass is most commonly used. Fiberglass insulation has a propensity to accumulate dirt, mold, and/or algae around where a valve stem passes through an opening in the insulation. This further perpetuates the potential penetration of environmental contaminants to come into direct contact with the product stream within the insulated conduits Therefore, to mitigate this possible contamination, it would be desirable to provide a valve handle shroud system that provides a prophylactic shield between the insulation and the valve seal to further isolate contamination breeding within the insulation, as well as airborne particulates.

It would also be desirable to provide a device to prevent contamination from migrating into the product through the valve assembly.

Moreover, it would be desirable to provide a device to prevent contamination from migrating into the product through the valve assembly and be compliant with the movement of the handle used to actuate the valve.

Furthermore, it would be desirable to provide a device to prevent contamination from migrating into the product through the valve assembly and be impervious to the surrounding environment.

BRIEF DESCRIPTION OF THE DRAWINGS

The drawings are only for purposes of illustrating various embodiments and are not to be construed as limiting, wherein.

DETAILED DESCRIPTION

Figure 1:
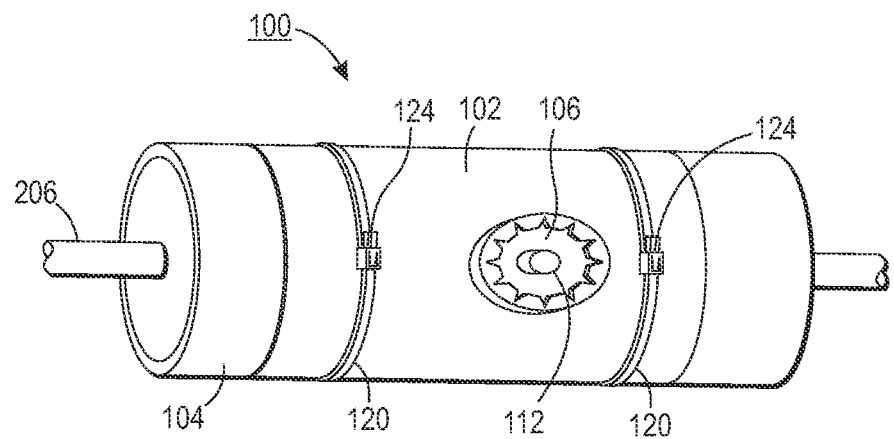
FIG. 1 is a perspective view of a base of a valve handle shroud system mounted on a conduit enclosed by insulation.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

FIG. 1 illustrates a portion of a valve handle shroud system 100 mounted on a conduit 206 enclosed by insulation 104. As illustrated in FIG. 1, the valve handle shroud system 100 includes a base 102 with an opening 106.

The base 102 may be constructed of a flexible sheet of plastic or metal material which is sufficiently pliable to conform to the curvature of the perimeter of insulation 104 that surrounds the immediate region of valve assembly 112. One purpose of the insulation 104 may be to thermally encapsulate the conduit 206 in order to maintain the required temperature for the material flowing through the conduit 206. Insulation 104 is typically used on conduits and vessels in food processing.

Base 102 may be secured to the insulation 104 by means of bands 120 (as illustrated), adhesive, tape, and/or mastic material, which effectively locate and maintain the base 102 in position around the valve assembly 112.

As illustrated, a removable securing mechanism includes first and second bands 120, which surround insulation 104 and base 100 in order to secure one to another. First and second binders 124 provide for a residual tension in bands 120 and typically comprise a buckle, clasp, or other such band binding or securing means.

In FIG. 1, an opening 106 provides a formed aperture in the base 102. The opening 106 surrounds the valve assembly 112, especially the valve stem supporting the actuation handle. Opening 106 may be elevated above the portion of the base 102, which is in contact with the insulation 104, to provide clearance for a valve stem extending outwardly therefrom.

Accordingly, the base 102 is centrally secured about the valve assembly 112 to provide for the mounting of a valve handle shroud (not shown).

Figure 2:
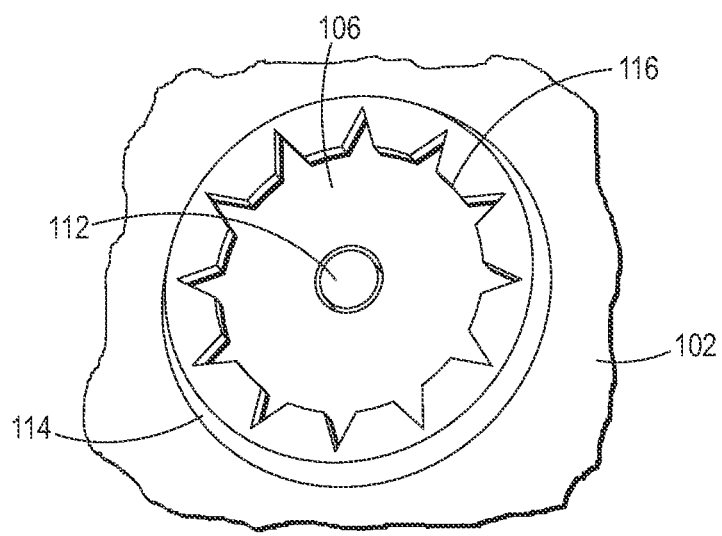
FIG. 2 is a cut away view of an opening in a base to mount a valve handle shroud to the base.

As illustrated in FIG. 2, the base 102 may include a raised portion 114 to provide clearance for a valve stem extending outwardly from the valve assembly housing. The base 102 may further include, surrounding the opening 106, a set of tabs 116. The tabs 116 provide a means for securely attaching the valve handle shroud (not shown) to the base 102. The tabs 116 provide a gripping function which prevents a base portion of the valve handle shroud (not shown) from rotating with respect to the base 102, while allowing the handle covering portion (202 of FIG. 3) to effectively twist with the movement of handle 210. The geometry of tabs 116 is such that the tabs 116 will yield during installation of shroud 202 so as to become engaged within slot 204.

It is noted that tabs 116, or the spaces there between, can be trapezoidal, rectangular, and/or triangular shape.

As illustrated the tabs/slot configuration enables the valve handle shroud (not shown) to be efficiently replaced without removal of the base 102 from the insulation.

It is noted that the set of tabs 116 may be replaced with a single lip or continuous rim to provide a surface for securely attaching the valve handle shroud (not shown) to the base 102, as well as, to provide a smooth surface to enable a base portion of the valve handle shroud (not shown) to rotate with respect to the base 102.

Figure 3:
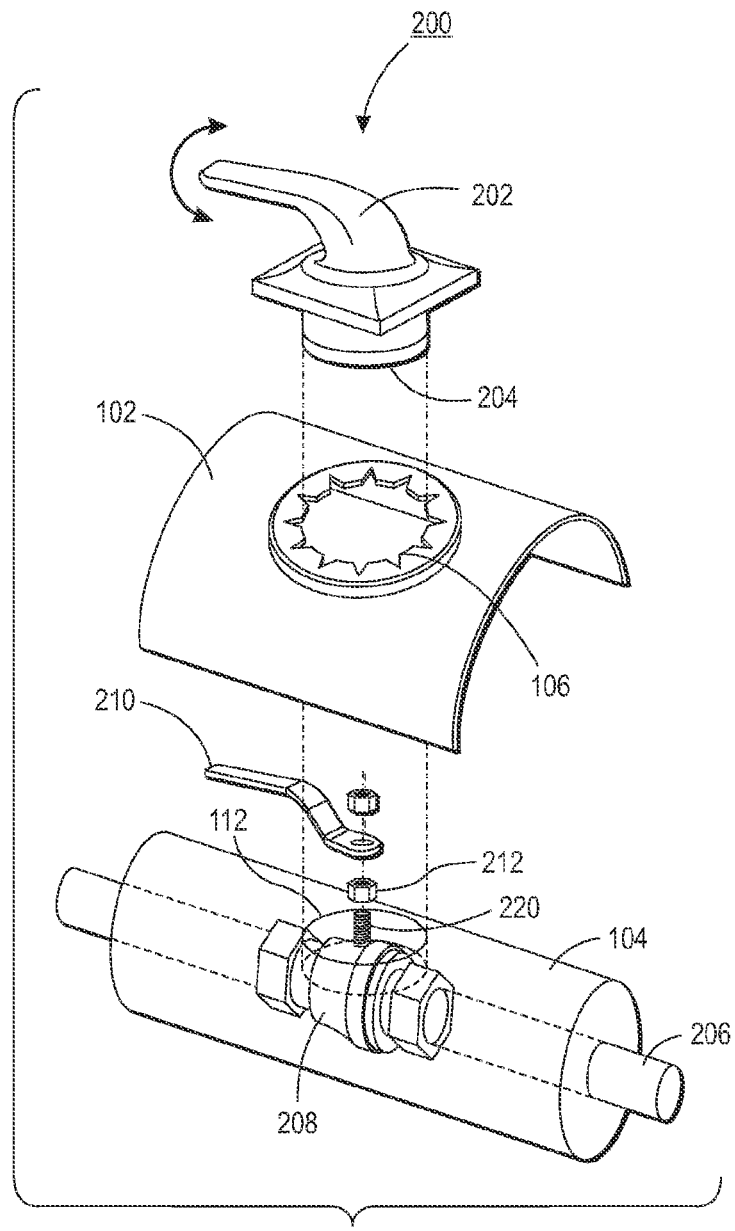
FIG. 3 is an exploded view of a shroud, base, valve handle, valve, conduit, and insulation.

Now referring to FIG. 3, it can be seen that the valve handle shroud system is shown in an exploded view. As illustrated, the base 102 is positioned between valve handle shroud 200 and valve assembly housing 208. The valve assembly housing 208 is connected to the conduit (pipe) 206 and embedded within insulation 104.

Valve handle shroud 200 is formed from an elastomeric molded material, in a tubular shape, having an interior profile suitable for receiving and conforming to the outer dimensions of valve handle 210 and stem 220 to form a virtually airtight covering.

In FIG. 3, the valve handle shroud 200 is illustrated as if it were enclosing the valve handle 210 and stem 220.

Figure 6:
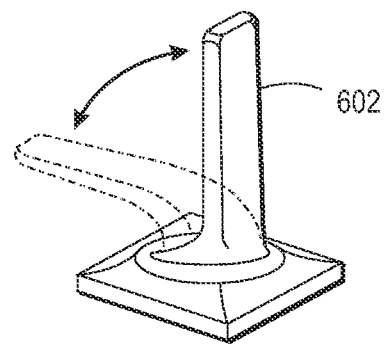
FIG. 6 is an isometric view of a valve handle shroud before installation.
Figure 7:
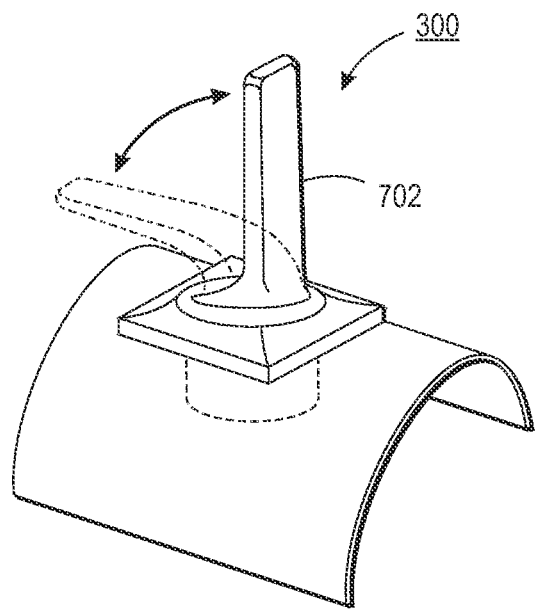
FIG. 7 is an isometric view of a valve handle shroud and base, as a single integral element.

It is noted that the valve handle shroud's normal state would appear as illustrated in FIGS. 6 and 7.

It is further noted that the valve handle shroud 200 is elastic so that it can end in a direction opposite to the direction illustrated in FIG. 3.

To securely mount valve handle shroud 200 to the base 102, tabs 106 engage slot 204 of the valve handle shroud 200 to secure and seal valve handle shroud 200 to base 106.

The illustrated tabs/slot configuration enables the valve handle shroud 200 to be efficiently replaced without removal of the base 106.

When the valve handle shroud 200 is securely mounted to the base 106, the two interconnected elements (valve handle shroud and base) provide an impervious flexible protective enclosure that substantially isolates the entire valve assembly from the ambient environment.

Moreover, illustrated tabs/slot configuration effectively prevents the base area of the valve handle shroud from rotating with respect to the base 106, while allowing the handle covering portion 202 to effectively rotate with the movement of the handle 210.

The handle cover portion 202 may be made from impervious and pliable material, for example elastomers, some polymers, textiles or any other flexible material that can be injection, woven or compression molded, so as to effectively allow rotation of the handle cover portion 202 in concurrence with the movement of the handle 210.

Furthermore the material may be given a specific color or characteristic to demarcate an explicit function or operation of a single or group of valves. Accordingly, when the valve handle shroud 202 is securely mounted to the base 106, the two interconnected elements (valve handle shroud and base) provide a protective shielded from the ambient environment for the miniscule air gap between valve stem 220 and valve body 208, thereby preventing contamination of the closed system.

While the valve assembly 208 is shown as a ball type valve, the principals and concepts discussed above are equally applicable to other types of valve assemblies, such as quarter turn valves, gate valves, plug valves, and butterfly valves.

It is noted that the valve handle shroud 202 may accommodate a 90-degree rotation when the valve handle is turned to change the state of the valve. In the event of a multi-turn valve handle, it may be necessary to use the aforementioned slip joint connection of FIG. 3 between base 102 and valve handle shroud 200.

Figure 4:
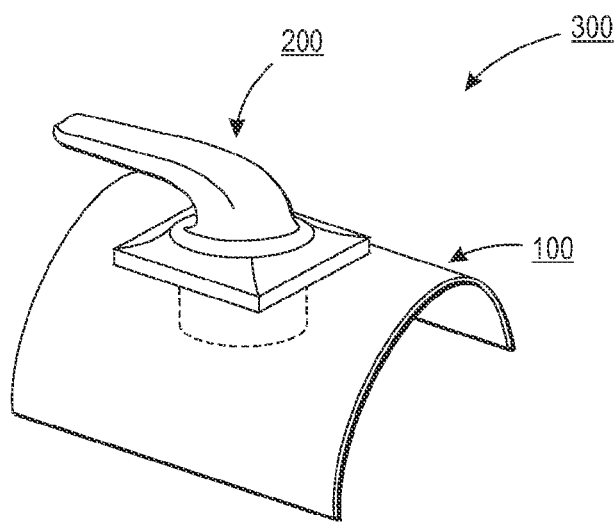
FIG. 4 shows a base and valve handle shroud, as an integral element, as if the valve handle shroud is encompassing a valve handle.

FIG. 4 depicts an alternative embodiment, wherein the base 100 and valve handle shroud 200 are designed as a single, integral assembly 300. The valve handle shroud/base assembly 300 may be molded from a homogeneous pliable material having a cross-section of various wall thicknesses to enhance strength, flexibility, and/or rigidity where needed.

Alternatively, the valve handle shroud 200 and the base 100 may be separately or discretely produced, from unique materials or same material, and subsequently bonded or fused together to form the valve handle shroud/base assembly 300.

The valve handle shroud/base assembly 300 may be secured to insulation 104 so as to be removable and replaced when necessary.

Figure 5:
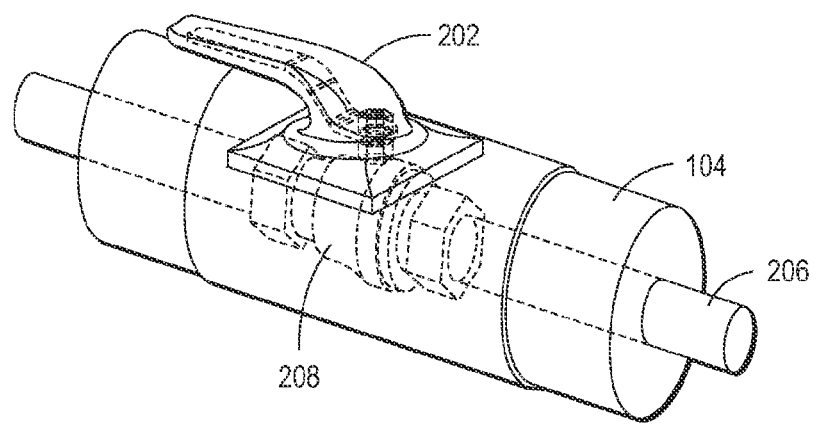
FIG. 5 is a view of a valve handle shroud and base assembled onto a valve.

FIG. 5 illustrates a valve handle shroud system in operation with a valve assembly. As illustrated in FIG. 5, valve handle shroud system is attached to insulation 104, which may surround a conduit (pipe) 206.

Moreover, as illustrated in FIG. 5, valve handle shroud system includes the handle cover portion 202, which engages the handle of the valve assembly to provide a contamination barrier for the valve assembly.

The handle cover portion 202 may be made from impervious and pliable material; for example elastomers, some polymers, textiles or any other flexible material that can be injection or compression molded; so as to effectively allow rotation of the handle cover portion 202 in association with the movement of the handle.

The form of the valve handle shroud as produced, and prior to being engaged with a valve handle, is generally straight, as shown in FIG. 6, for the separate valve handle shroud 602 and/or, as shown in FIG. 7, for the valve handle shroud/base assembly 300 including valve handle shroud 702. This configuration enables ease of manufacturing, as well as, a versatile sheath portion that is capable of conforming to a variety of handles and/or stems.

However, valve handle shroud is flexible to conform to the shape of the handle as shown by the dotted lines in FIGS. 6 and 7.

In operation, as a product passes through the conduit, it comes into direct contact with the stem seal of the valve assembly, which provides for a potential breech point to allow a contaminant to enter into the product stream. By design, the seal is not able to be physically connected to the stem; and thus, a micro air gap may exist to allow the stem to slip within the seal. This gap, albeit measured in microns, is considered to be sufficient space for microbial migration into the valve body and into the product stream.

To mitigate this possible contamination, the valve handle shroud system provides a prophylactic measure against contamination by shielding the valve stem and seal thereby providing substantial immunity against contamination.

An enclosure for a valve assembly may include a base having an opening that allows a portion of a valve assembly to pass there through, and a valve handle shroud, affixable to the base at the opening thereof, to encapsulate a handle/stem unit of the valve assembly.

The valve handle shroud may include a base portion to rigidly connect to the base and a handle cover portion of the valve handle shroud being pliable enough to allow rotation of the handle cover portion in unison with the movement the handle/stem unit of the valve assembly.

The opening of the base may include a set of tabs to rigidly connect the base to the base portion of the valve handle shroud.

The base portion of the valve handle shroud may include a groove to engage the set of tabs.

The compliant enclosure valve handle shroud may include a raised portion between the base portion and the handle cover portion to provide a volume for a stem of the valve assembly and a vertical portion of a handle of the valve assembly.

The valve handle shroud may be molded from a pliable material having a cross-section of various wall thicknesses.

The valve handle shroud protective enclosure provides a safeguard for the valve stem and seal so as to provide substantial immunity against contamination of the product stream.

The valve handle shroud may be fabricated so as to be compliant with the handle as it is placed over the valve handle and stem.

The valve handle shroud may accommodate a 90-degrees twist (rotation) when the valve handle is turned to change the state of the valve.

In addition, conduits leading into or out of processing chambers may be temperature controlled, and therefore, may include an insulating jacket therearound. Typically, a valve stem must pass through a hole bored in the insulation which further allows potential penetration of environmental contaminants to come into direct contact with the product stream within the conduits.

To mitigate this possible contamination, the valve handle shroud system provides a prophylactic measure against contamination through the shroud/base configuration.

In summary, an enclosure for a valve assembly may include a base having an opening that allows a portion of a valve assembly to pass therethrough, and a valve handle shroud, affixable to the base at the opening thereof, to encapsulate a handle/stem assembly of the valve assembly.

The valve handle shroud may include a base portion to rigidly connect to the base and a handle cover portion of the valve handle shroud being pliable and/or compliant to allow rotation of the handle cover portion in association with movement of a handle of the handle/stem assembly of the valve assembly and/or provide a snug or tight fit around the valve handle.

The opening of the base may include a set of tabs to rigidly connect the base to the base portion of the valve handle shroud.

The valve handle shroud may be removable from the base.

The base portion of the valve handle shroud may include a groove to engage the set of tabs.

The enclosure valve handle shroud may include a raised portion between the base portion and the handle cover portion to provide a volume for a stem of the valve assembly and a vertical portion of a handle of the valve assembly.

The valve handle shroud may be molded from a homogeneous pliable material having a cross-section of various wall thicknesses.

An enclosure for a valve assembly may include a base having an opening that allows a portion of a valve assembly to pass therethrough and a valve handle shroud, extending from the base, to encapsulate a handle/stem assembly of the valve assembly.

The base and valve handle shroud may be integrally formed.

It will be appreciated that several of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. An enclosure for a valve assembly comprising:
a base for mounting onto a conduit having a valve assembly, said base having an opening that allows a portion of the valve assembly to pass therethrough; and
a valve handle shroud, affixable directly to said opening of said base, to encapsulate a stem and an entire handle of a handle/stem assembly of the valve assembly;
said valve handle shroud including a base portion;
said valve handle shroud including a handle cover portion to encapsulate the stem and entire handle of the handle/stem assembly of the valve assembly;
said handle cover portion being pliable to allow rotation of said handle cover portion in association with movement of the handle of the handle/stem assembly of the valve assembly;
said base portion being rigidly connected to said base so as to prevent rotation of said base portion in association with movement of the handle of the handle/stem assembly of the valve assembly.

2. The enclosure for a valve assembly as claimed in claim 1, wherein said opening of said base includes a plurality of tabs to rigidly connect said base to said base portion of said valve handle shroud.

3. The enclosure for a valve assembly as claimed in claim 2, wherein said tabs are triangular.

4. The enclosure for a valve assembly as claimed in claim 2, wherein said tabs are rectangular.

5. The enclosure for a valve assembly as claimed in claim 2, wherein said tabs are trapezoidal.

6. The enclosure for a valve assembly as claimed in claim 1, wherein said valve handle shroud is removable from said base.

7. The enclosure for a valve assembly as claimed in claim 1, wherein said valve handle shroud includes a raised portion between said base portion and said handle cover portion to provide a volume for the stem of the valve assembly and a vertical portion of the handle of the valve assembly;

said raised portion being pliable to allow rotation of said raised portion in association with movement of the handle of the handle/stem assembly of the valve assembly.

8. The enclosure for a valve assembly as claimed in claim 1, wherein said valve handle shroud is molded from a homogeneous pliable material having a cross-section of various wall thicknesses.

9. An enclosure for a valve assembly comprising:
a base for mounting onto a conduit having a valve assembly, said base having an opening that allows a portion of the valve assembly to pass therethrough; and
a valve handle shroud, affixable to said base at said opening thereof, to encapsulate a stem and an entire handle of a handle/stem assembly of the valve assembly;
said valve handle shroud including a base portion;
said valve handle shroud including a handle cover portion to encapsulate the stem and the entire handle of the handle/stem assembly of the valve assembly;
said handle cover portion being pliable to allow rotation of said handle cover portion in association with movement of the handle of the handle/stem assembly of the valve assembly;
said base portion being rigidly connected to said base so as to prevent rotation of said base portion in association with movement of the handle of the handle/stem assembly of the valve assembly;
said opening of said base including a plurality of tabs to rigidly connect said base to said base portion of said valve handle shroud;
said base portion of said valve handle shroud including a single groove to engage said plurality of tabs.

10. The enclosure for a valve assembly as claimed in claim 9, wherein said valve handle shroud is molded from a homogeneous pliable material having a cross-section of various wall thicknesses.

11. The enclosure for a valve assembly as claimed in claim 9, wherein said valve handle shroud is removable from said base.

12. The enclosure for a valve assembly as claimed in claim 11, wherein said valve handle shroud is molded from a homogeneous pliable material having a cross-section of various wall thicknesses.

13. The enclosure for a valve assembly as claimed in claim 9, wherein said valve handle shroud includes a raised portion to provide a volume for the stem of the valve assembly and a vertical portion of the handle of the valve assembly;

said raised portion being pliable to allow rotation of said raised portion in association with movement of the handle of the handle/stem assembly of the valve assembly.

14. The enclosure for a valve assembly as claimed in claim 9, wherein said tabs are triangular.

15. The enclosure for a valve assembly as claimed in claim 9, wherein said tabs are rectangular.

16. The enclosure for a valve assembly as claimed in claim 9, wherein said tabs are trapezoidal.

17. An enclosure for a valve assembly comprising:
a base for mounting onto a conduit having a valve assembly, said base having an opening that allows a portion of the valve assembly to pass therethrough; and
a valve handle shroud, extending from said base, to encapsulate both a stem and an entire handle of a handle/stem assembly of the valve assembly;
said valve handle shroud including a base portion;
said valve handle shroud including a handle cover portion to encapsulate the stem and the entire handle of the handle/stem assembly of the valve assembly;
said handle cover portion being pliable to allow rotation of said handle cover portion in association with movement of the handle of the handle/stem assembly of the valve assembly;
said base portion being rigidly connected to said base so as to prevent rotation of said base portion in association with movement of the handle of the handle/stem assembly of the valve assembly;
said valve handle shroud and said base being integrally formed of a homogeneous material.

18. The enclosure for a valve assembly as claimed in claim 17, wherein said valve handle shroud-further comprising:
a raised portion between said base portion and said handle cover portion to provide a volume for the stem of the valve assembly and a vertical portion of the handle of the valve assembly;
said raised portion being pliable to allow rotation of said raised portion in association with movement of the handle of the handle/stem assembly of the valve assembly.

19. The enclosure for a valve assembly as claimed in claim 18, wherein said homogeneous material of said valve handle shroud is pliable and having a cross-section of various wall thicknesses.

20. The enclosure for a valve assembly as claimed in claim 17, wherein said homogeneous material of said valve handle shroud is pliable and having a cross-section of various wall thicknesses.

* * * * *